(12) United States Patent
Kitozaki

(10) Patent No.: US 7,298,979 B2
(45) Date of Patent: Nov. 20, 2007

(54) IMAGE READER ATTACHABLE PRINTER

(75) Inventor: Yukihiro Kitozaki, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 986 days.

(21) Appl. No.: 10/390,728

(22) Filed: Mar. 19, 2003

(65) Prior Publication Data

US 2003/0179390 A1   Sep. 25, 2003

(30) Foreign Application Priority Data

Mar. 20, 2002   (JP)   .............................. 2002-077905

(51) Int. Cl.
*G03G 15/00*   (2006.01)

(52) U.S. Cl. .......................................... 399/7; 399/107

(58) Field of Classification Search .................... 399/7, 399/107, 109, 367–375
See application file for complete search history.

(56) References Cited

U.S. PATENT DOCUMENTS 5,097,350 A * 3/1992 Baran .......................... 358/401
5,255,054 A * 10/1993 Tsai ................................ 399/7
2002/0168197 A1   11/2002 Kitozaki ...................... 399/88

FOREIGN PATENT DOCUMENTS

| JP | 9-304987 | 11/1997 |
| JP | 11-112706 | 4/1999 |
| JP | 2001-130089 | 5/2001 |
| JP | 2002060119 A * | 2/2002 |

* cited by examiner

*Primary Examiner*—David M. Gray
*Assistant Examiner*—Erika J. Villaluna
(74) *Attorney, Agent, or Firm*—Fitzpatrick, Cella, Harper & Scinto

(57) ABSTRACT

An image forming apparatus, that includes a printer section having a sheet delivery portion at a top thereof, and a frame arranged at a top surface of the printer section so as to extend in substantially an L-shape to a rear side and one lateral side of the printer section. An image reader is optionally attached to the top surface of the frame, and a sheet can be pulled out of both a front side and another lateral side at which no frame is provided.

8 Claims, 15 Drawing Sheets

| box |
| --- | user box          occupied rate

| box number | title | | |
|---|---|---|---|
| 00 ▷ | | 0% | |
| 01 ▷ | | 0% | 1/15 |
| 02 ▷ | | 0% | |
| 03 ▷ | | 0% | |
| 04 ▷ | | 0% | |
| 05 ▷ | | 0% | |
| 06 ▷ | | 0% | | memory left

100% system status / stop ▷

(B)

| copy | transmit/fax | box | expansion |
| --- | --- | --- | --- |

| copy available | | local |
| --- | --- | --- |
| | automatic | |
| 100% | A4 | 1 |

| equal rate | expansion and reduction rate ▷ | paper selection ▷ |
| --- | --- | --- | automatic

| sorter ▷ | both sides ▷ | letters ▽ |

☐ breaking in          applied mode ▷ system status / stop ▷

PRIOR ART

PRIOR ART

IMAGE READER ATTACHABLE PRINTER

BACKGROUND OF THE INVENTION

1. Field of the Invention

This invention relates to a solely usable image recording apparatus, and an image forming apparatus that can read images as well as can make recording upon coupling to optional image reader apparatus with the image recording apparatus.

2. Description of Related Art

Digital image processing today allows reading and recording images separately, and coupling of an image reader apparatus and an image recording apparatus, usable individually, allows using a photocopier or the like capable of reading and recording images.

For example, as shown in FIG. 12, an image forming apparatus exists which coupling an image reader apparatus 11A (hereinafter referred to as "reader apparatus") with an image recording apparatus 111A (hereinafter referred to as "printer apparatus").

In the image forming apparatus as shown in FIG. 12, an original document automatic feeding apparatus 40A feeds an original document on an original document glass 201A when a copying button is pushed, and an exposing apparatus 202A radiates the original document and moves in arrow a direction to scan the entire side of the original document.

Light beam radiating the original document from the exposing apparatus is reflected at second and third mirrors 203A and converges on a CCD 204A by lens. The original document read by the CCD 204A is sent to a laser scanner 100A upon conversion to an electrical signal at the image processing section. An image recording optical system scans beam corresponding to image information radiated from the laser scanner 100A to converge images on a photosensitive drum 101A to produce an electrostatic latent image. The electrostatic latent image is developed by a developing device 102A.

Recording sheets are set in a feeding cassette 1A and contained in the apparatus body. When the feeding cassette 1A is set with the body, a sheet surface in the feeding cassette 1A is lifted by a lifting motor, not shown, to render the sheets ready to be fed. The recording sheets start to be moved according to rotation of a feeding roller 2A, are separated sheet by sheet with separation roller pair 3A, 4A, and are conveyed to the registration roller pair 7A, 8A via upstream side conveyance roller pair 5A, 6A.

The recording sheets whose registration, or position, is corrected by the registration roller pair 7A, 8A are further conveyed to a transfer section, and the images previously developed by the developing device 102A are transferred with the photosensitive drum 101A and a transfer roller 103A on a recording sheet. Recording sheets to which the images are thus transferred are removed from the photosensitive drum 101A by a separation charger.

Then, a fixing device 11A fixes the images on the recording sheets via a conveyance section and delivers the sheets with a delivery roller 12A, thereby finishing a photocopier operation on one side in which the copied images come to the back side.

A coupling method for the conventional reader apparatus 110A and the conventional printer apparatus 111A, for such a photocopying image forming apparatus, is described in referring to FIGS. 13 to 15.

FIG. 13(A) shows a printer apparatus 111A for rendering transferring, recording, and delivering of the images, and a delivery section 112A is placed to a top surface thereof to deliver the recording sheets. FIG. 13(B) shows a reader apparatus 110A for reading the images to be copied; FIG. 13(C) shows a rack apparatus serving as a frame for holding the reader apparatus 11A when the printer apparatus 111A and the reader apparatus 110A are coupled.

FIG. 14(A) shows a photocopying image forming apparatus 114A to which the printer apparatus 111A and the reader apparatus 110A are coupled via the rack apparatus 113A. FIG. 14(B) shows a wire connection of the printer apparatus 111A and the reader apparatus 110A of the photocopying image forming apparatus 114A; a printer controller 115A for electrically controlling the printer apparatus body installed in the printer apparatus 111A and a reader controller 116A for controlling the reader apparatus 110A communicate to each other through a communication cable 117A.

A power is supplied to the reader apparatus 110A via a power supply cable 119A from a power supply unit 118A for supplying power for the printer apparatus body installed in the printer apparatus 111A.

It is to be noted that with the conventional example, a control panel 120A of the photocopying image forming apparatus is attached to the reader apparatus 110A, and no control panel 120A is attached to the printer apparatus 111A, thereby forming the photocopying image forming apparatus 114A, as a premise, upon coupling the reader apparatus 110A to the printer apparatus 111A. Therefore, the printer apparatus 111A itself does not have any control panel and does not function as a printer apparatus 111A solely.

It is to be noted that as shown in FIG. 15, if a control panel 120B is provided on a side of the printer apparatus 11B, the apparatus can operate as the printer apparatus 111B solely.

With the conventional structure, as shown in FIG. 14 and FIG. 15, the reader apparatuses 111A, 110B cannot be supported without the rack apparatuses 113A, 113B. The rack apparatuses 113A, 113B hold the reader apparatuses 111A, 110B, and are formed with high strength because needing to guarantee durability against exertion of downward force of 10 kg or more when the user manipulates the reader apparatuses 110A, 110B. The rack apparatus 113A, 113B are very expensive.

As shown in FIG. 15, where a control panel 120B is arranged to the printer apparatus 111B, the user cannot manipulate easily the photocopying image forming apparatus when the apparatus is manipulated only by this control panel 120B because the level (arrow a1) of the unit is low.

First, providing the control panel 120A even to the side of the reader apparatus 110B may be a solution but increases the costs of the apparatus. Second, lifting a level of the printer apparatus 111B as to render the control panel 120B easily controlled is another solution, but this narrows the delivery section 112B, thereby making the user difficult to pick up the sheets. The high level of the reader apparatus 110B generates problems such that the copied original documents are not easily placed.

SUMMARY OF THE INVENTION

It is an object of the invention to provide an image forming apparatus in which an image reader can be attached directly to a printer apparatus.

It is another object of the invention to provide an image forming apparatus in which delivered sheets can be pulled out between an optionally provided image reader and a printer apparatus.

It is yet another object of the invention to provide an image forming apparatus including a printer apparatus having a sheet delivery portion at a top thereof; and a frame arranged at a top surface of the printer apparatus as to extend in substantially a letter L-shape to a rear side and one lateral side of the printer apparatus, wherein an image reader is optionally attached to the top surface of the frame, and wherein a sheet can be pulled out of both of a front side and another lateral side at which no frame is provided.

Further objects of the invention will be apparent from the following description.

BRIEF DESCRIPTION OF THE DRAWINGS

FIG. 11 is an illustration showing a display panel of a control panel;

DETAILED DESCRIPTION OF PREFERRED EMBODIMENTS

Figure 1:
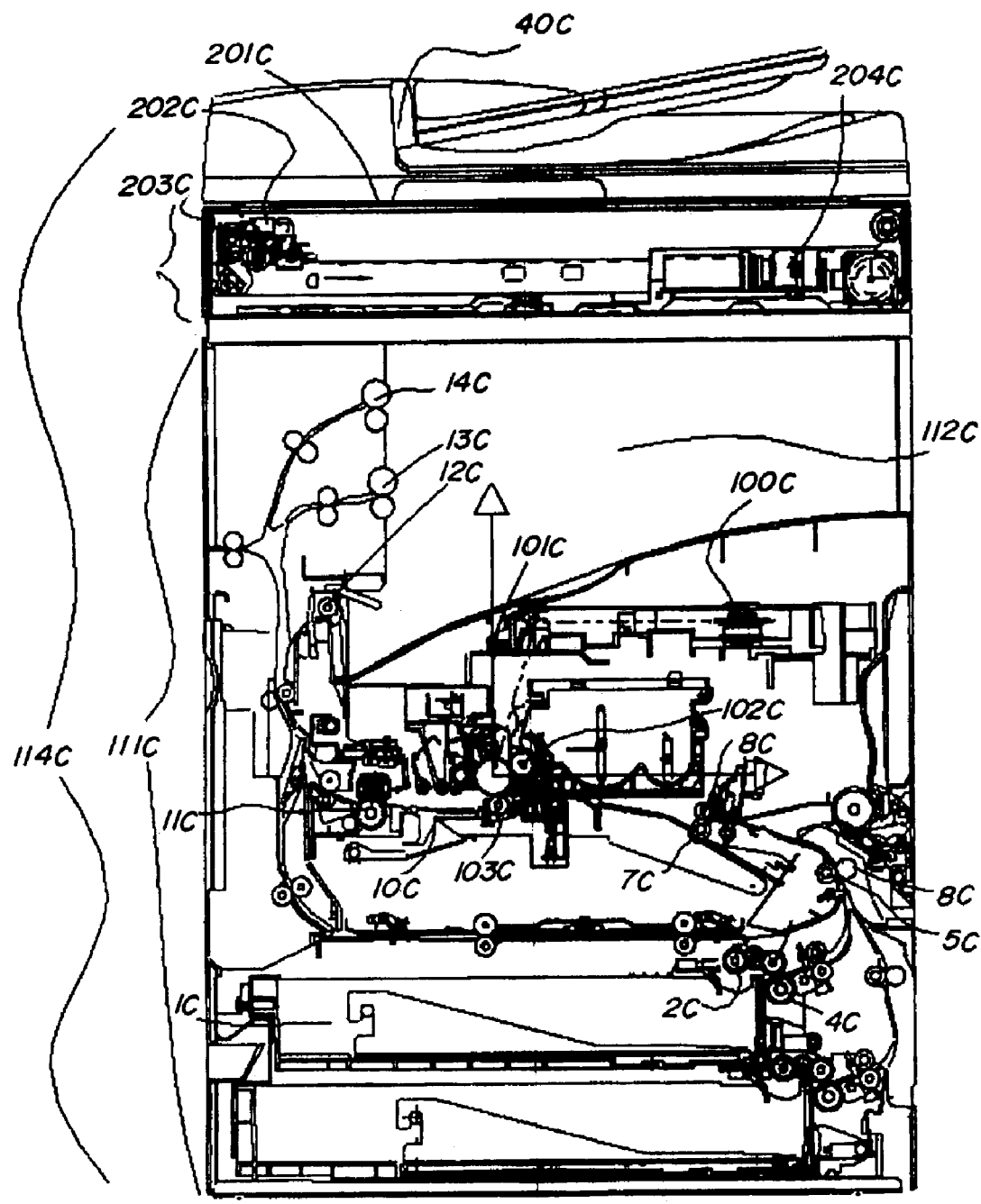
FIG. 1 is a structural illustration showing a photocopying image forming apparatus according to an embodiment of the invention.
Figure 2:
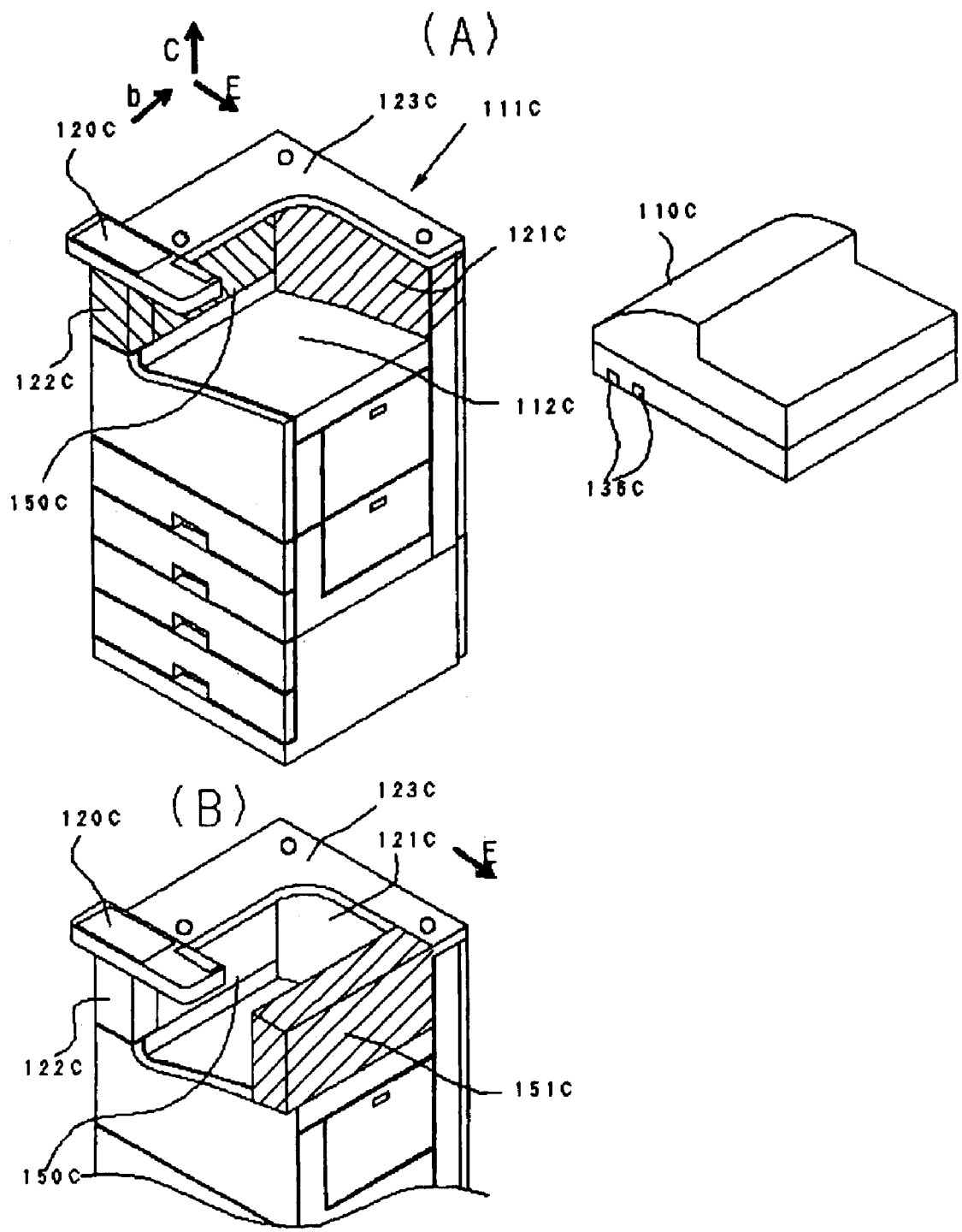
FIG. 2 is an illustration showing a printer apparatus and a reader apparatus.

Referring to the drawings, an image forming apparatus according to an embodiment of the invention is described.

[First Embodiment]

[Whole Apparatus Structure]

First, referring to FIG. 1, the whole structure of a photocopying image forming apparatus 114C in which an image reading apparatus 110C (hereinafter referred to as "reader apparatus") and an image recording apparatus 111C (hereinafter referred to as "printer apparatus") are coupled.

It is to be noted that the printer apparatus 111C can be used solely, and functions as an image forming apparatus serving as a photocopier or facsimile machine capable of reading or recording images upon coupling a reader apparatus 110C.

The basic structure of image reading and image recording is substantially the same as the structure of the prior art. That is, an original document automatic feeding apparatus 40C feeds an original document on an original document glass 201C when a copying button is pushed, and an exposing apparatus 202C radiates the original document and moves in arrow a direction to scan the entire side of the original document.

Light beam radiating the original document from the exposing apparatus is reflected at second and third mirrors 203C and converges on a CCD 204C by lens. The original document read by the CCD 204C is sent to a laser scanner 100C upon conversion to an electrical signal at the image processing section. An image recording optical system scans beam corresponding to image information radiated from the laser scanner 100C to converge images on a photosensitive drum 101C to produce an electrostatic latent image. The electrostatic latent image is developed by a developing device 102C.

Recording sheets are set in a feeding cassette IC and contained in the apparatus body. When the feeding cassette IC is set with the body, a sheet surface in the feeding cassette IC is lifted by a lifting motor, not shown, to render the sheets ready to be fed. The recording sheets start to be moved according to rotation of a feeding roller 2C, are separated sheet by sheet with separation roller pair 3C, 4C, and are conveyed to the registration roller pair 7C, 8C via upstream side conveyance roller pair 5C. 6C.

The recording sheets whose registration, or position, is corrected by the registration roller pair 7C, 8C are further conveyed to a transfer section, and the images previously developed by the developing device 102C are transferred with the photosensitive drum 101C and a transfer roller 103C on a recording sheet.

Recording sheets to which the images are thus transferred are removed from the photosensitive drum 101C by a separation charger. Then, a fixing device 11C fixes the images on the recording sheets via a conveyance section 10C and delivers the sheets with any of a first delivery roller 12C, a second delivery roller 13C, and a third delivery roller 14C, thereby finishing a photocopier operation on one side.

[Coupling Structure of the Reader Apparatus and the Printer Apparatus]

Subsequently, a coupling method of the reader apparatus 110C and the printer apparatus 111C is described in reference to FIG. 2 to FIG. 11.

FIG. 2(A) is a perspective illustration showing the printer apparatus 111C and the reader apparatus 110C of the embodiment. It is to be noted that arrow b direction in FIG. 2(A) is a direction toward the apparatus front; the proximal end of arrow b is a front side of the apparatus; and the distal end of arrow b is a rear aide of the apparatus.

The printer apparatus 111C has a structure that the reader apparatus 110C is directly placed to a top of the printer apparatus 111C, requiring no rack apparatus unlike the prior art, so that the costs for the apparatus becomes inexpensive. The printer apparatus 111C therefore has a housing or frame for supporting the reader apparatus 110C at the top of the printer apparatus 111C; side walls 121C, 122C (hatching regions in FIG. 2(A)) of two directions other than the front side extend upward (arrow c direction) so as to open a delivery portion 112C when viewed from a front side of the printer apparatus 111C (arrow b direction); a holding portion 123C couples the two side walls 121C, 122C as to connect the two walls. The reader apparatus 110C is to be mounted on the top surface of the holding portion 123C.

A control panel 120C for instructing the apparatus manipulations is secured to an upper portion of the side wall 122C for mounting the reader apparatus 110C and is arranged at a location where the users can control easily.

It is to be noted that the side wall serving as a holding portion for the reader apparatus 110C can be placed at a region 151C (hatching region in FIG. 2(B)) opposing to the delivery section 150C in arrow E direction as shown in FIG. 2(B). If the side wall is provided at this region, however, the delivered recording sheets are difficult to be pulled out by the users, so that it is desirable to place the side wall 122 at the portion of the delivery means as described above whereas the side wall 121C is placed on the rear side of the apparatus body.

Figure 3:
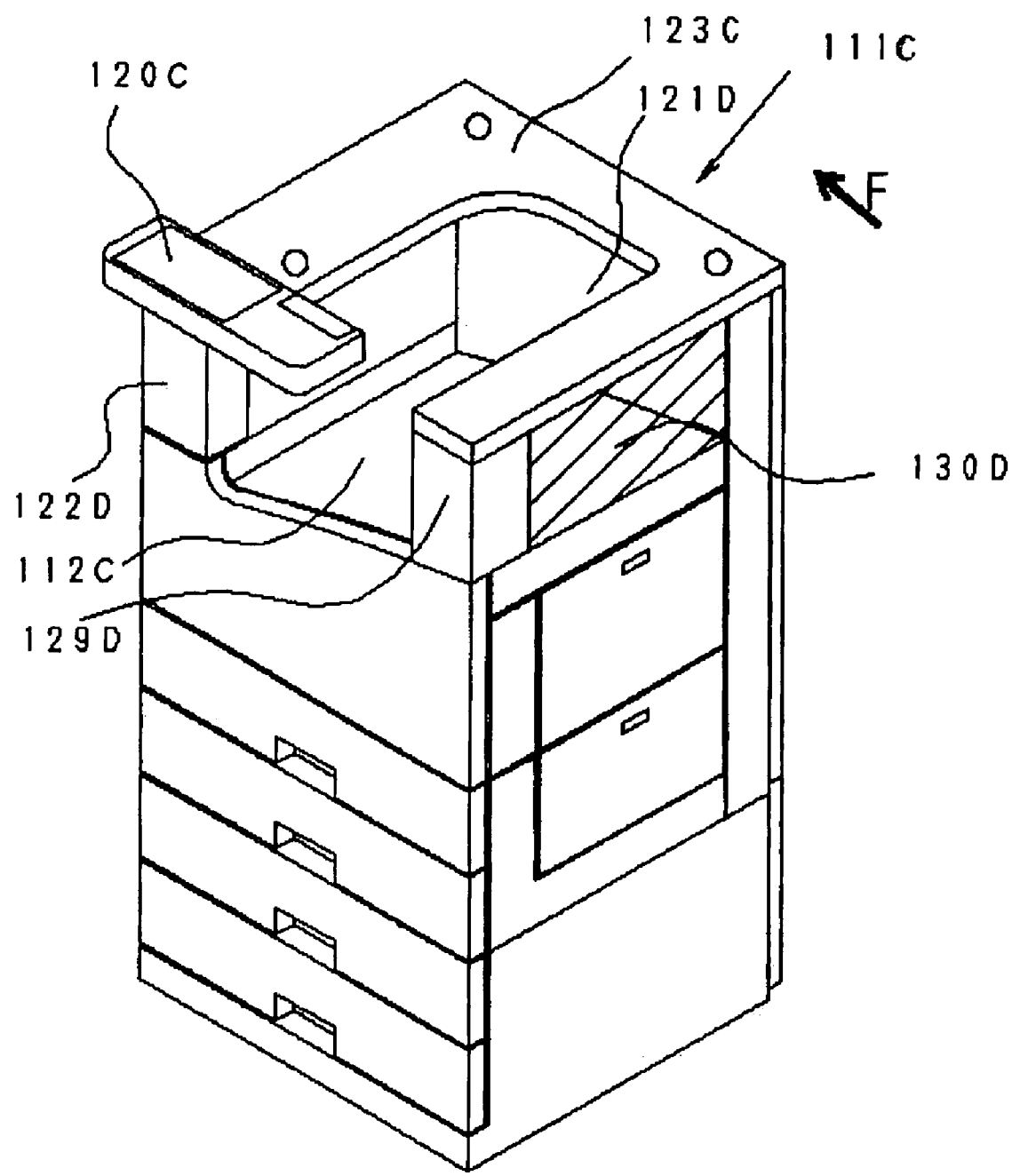
FIG. 3 is an illustration showing the printer apparatus.

If a side wall is arranged at the region 151C opposing to the delivery section 150C in arrow E direction, a side wall 129D having an opening 130D (hatching region in FIG. 3) is desirably arranged as shown in FIG. 3 so as to allow the users to pull out the recording sheets from arrow F direction, and in such a situation, the side walls are constituted of three faces (121D, 122D, 129D).

[Housing Structure]

Figure 4:
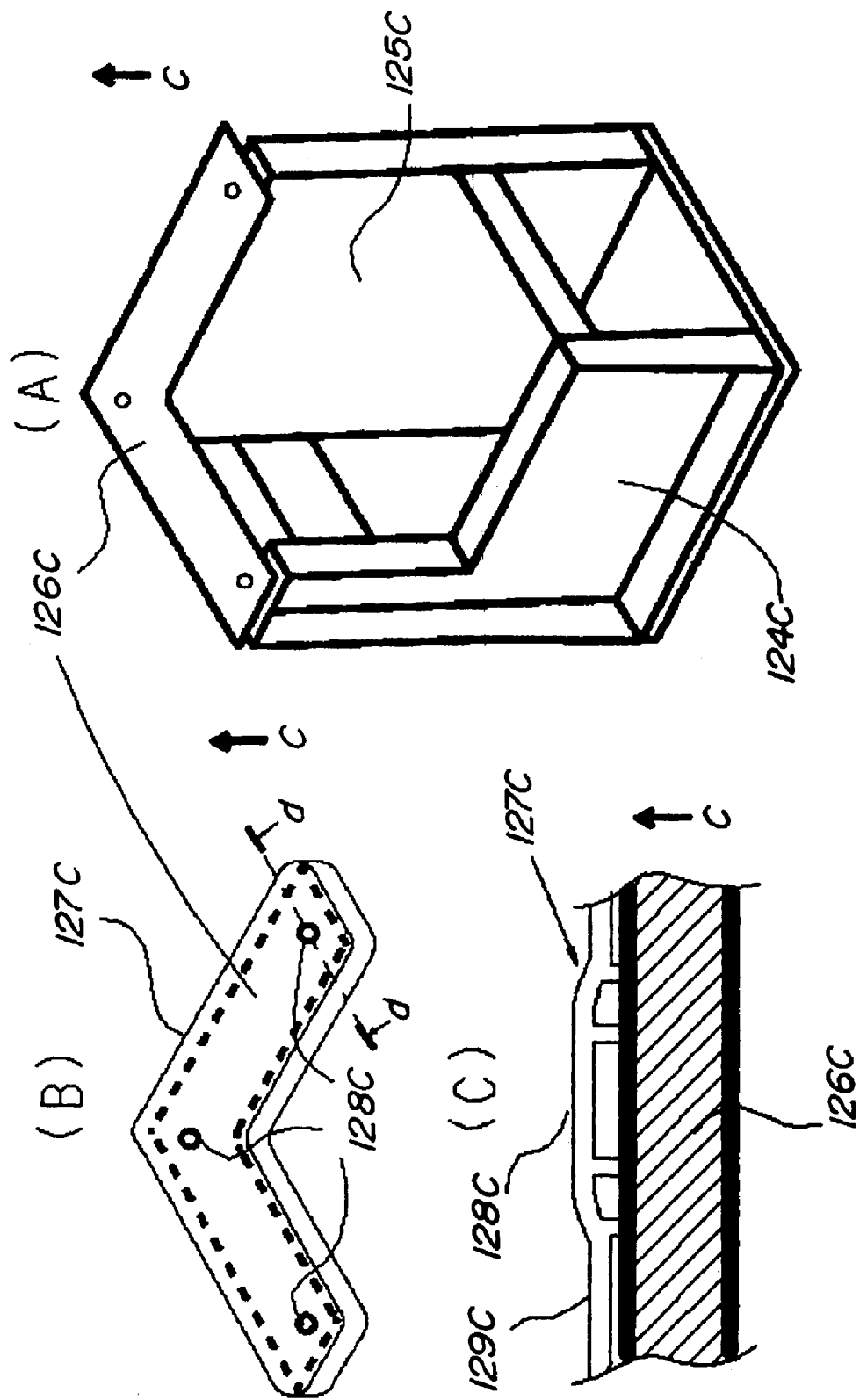
FIGS. 4(a) to 4(c) are illustrations showing a housing of the printer apparatus.

A housing structure of the printer apparatus 111C to which the reader apparatus can be mounted is described in reference to FIG. 4. FIG. 4(A) shows the housing of the printer apparatus 111C. A front frame 124C and a rear frame 125C of the body extend upwardly (arrow C direction), and a holding frame 126C is secured to a top surface of the body as to connect the front frame 124 and the rear frame 125C. That is, the hosing for holding the reader apparatus 110C is structured of a body frame of the printer apparatus 111C.

It is to be noted that as shown in FIG. 4(B), a top cover 127C is secured to a top surface of the holding frame 126C so as to constitute a top outer portion of the printer apparatus 111C. Numeral 128C is a holding surface on which the reader apparatus is mounted. In this structure, the surfaces 128C are provided at three locations, and those can raise the accuracy of the level direction (arrow C direction) where the surfaces are provided at or more locations.

It is to be noted that FIG. 4(C) shows cross section d-d in FIG. 4(B) as a cross section of the holding surface 128C. The holding surface 128C of the top cover 127C is made higher than the other surface 129C, and with the top cover 127C, the level at which the reader apparatus 110C is mounted becomes highly accurate only by rendering accurate the size in the level direction (arrow C direction) of the holding surface 128C (three locations in this embodiment), so that the position in the level direction of the reader apparatus is guaranteed. It is to be noted that the levels of the holding surfaces 128C at three locations become substantially the same in this embodiment.

Substantially the same advantages can be obtained even without the holding frame 126C, if the front frame 124C and the rear frame 125C support the holding surfaces 128C for guaranteeing the level of the reader apparatus 110C.

[Coupling of the Printer Apparatus and the Reader Apparatus]

Figure 5:
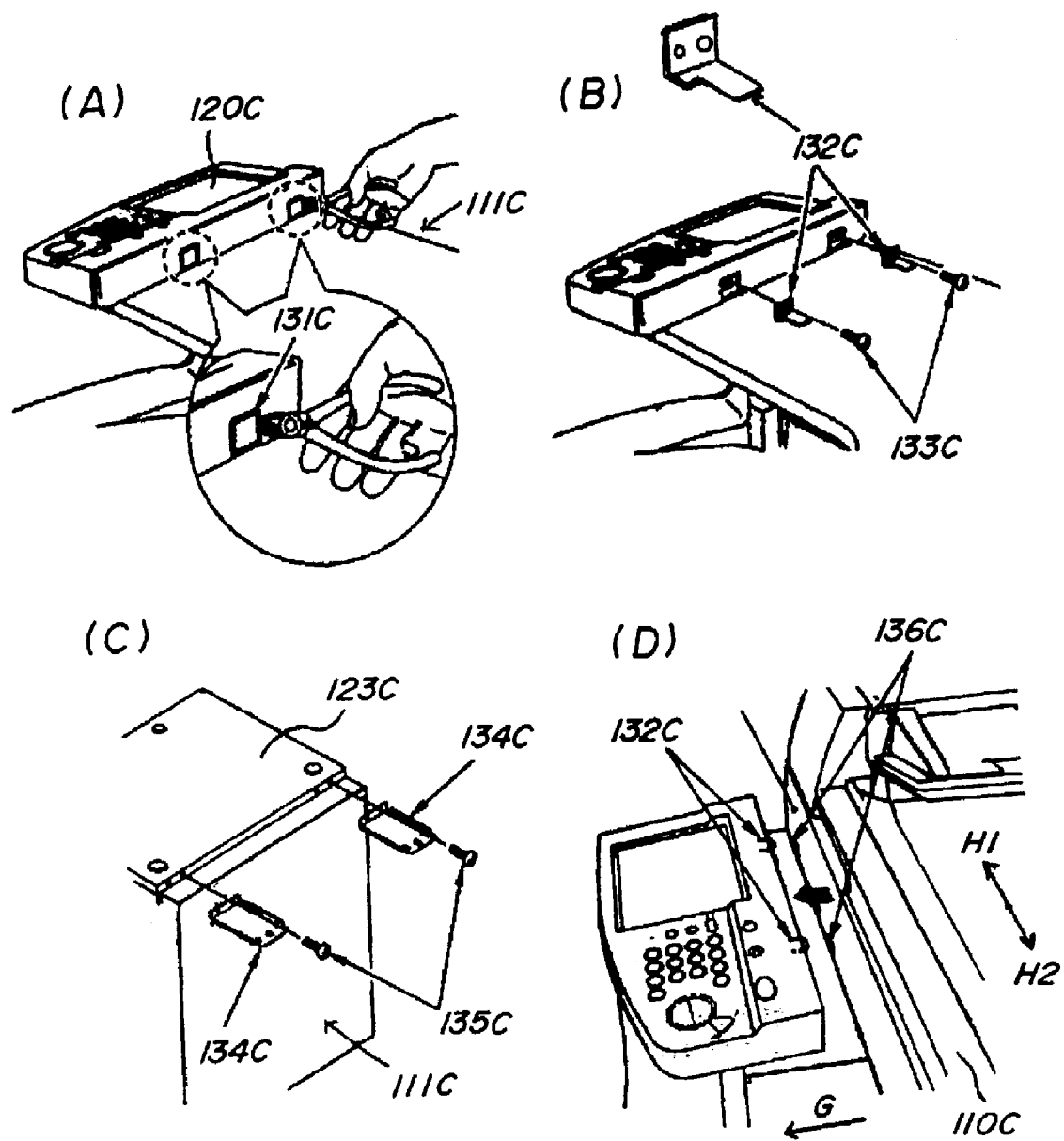
FIGS. 5(a) to 5(d) are illustrations showing coupling of the printer apparatus and the reader apparatus.
Figure 6:
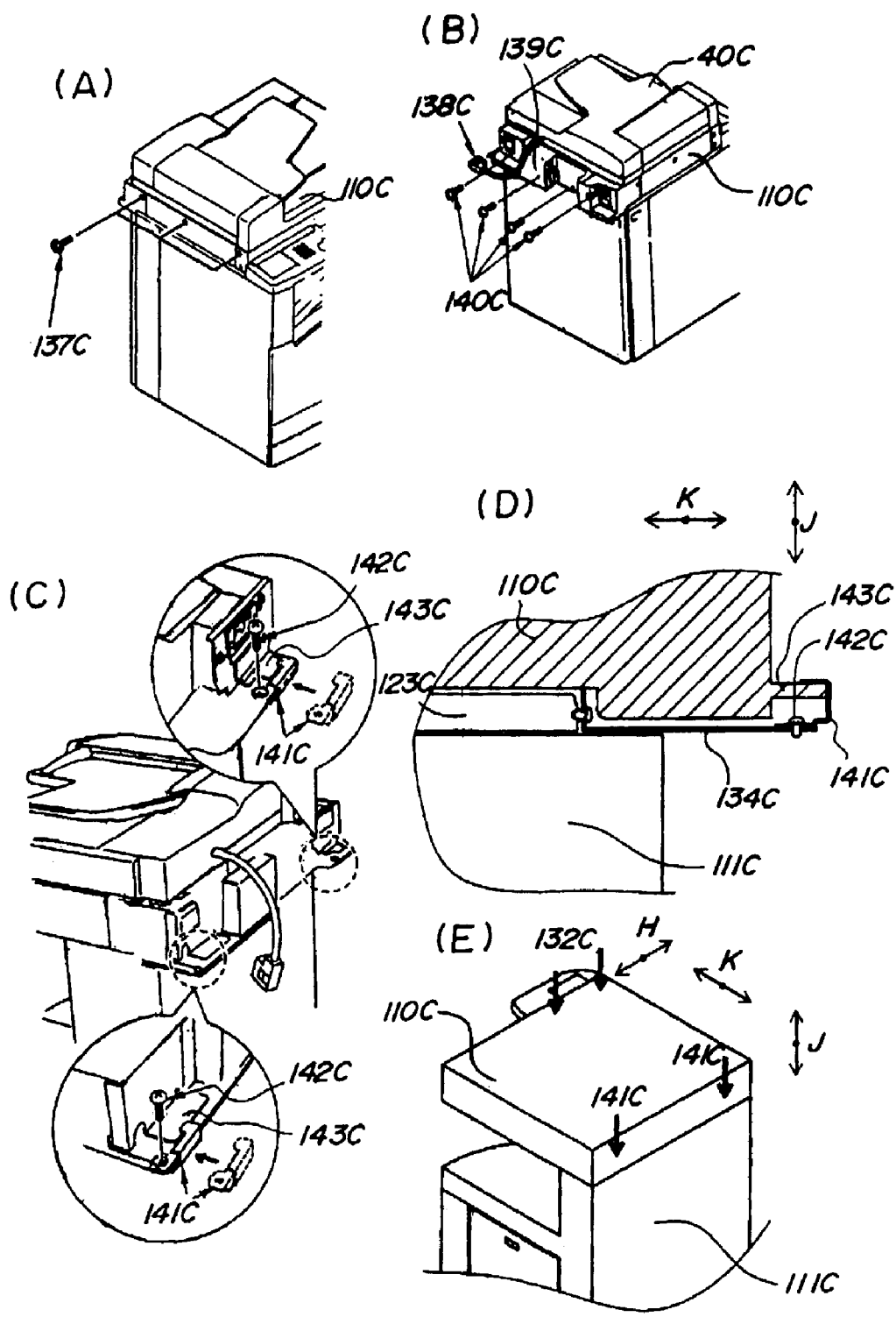
FIGS. 6(a) to 6(e) are illustrations showing coupling of the printer apparatus and the reader apparatus.
Figure 7:
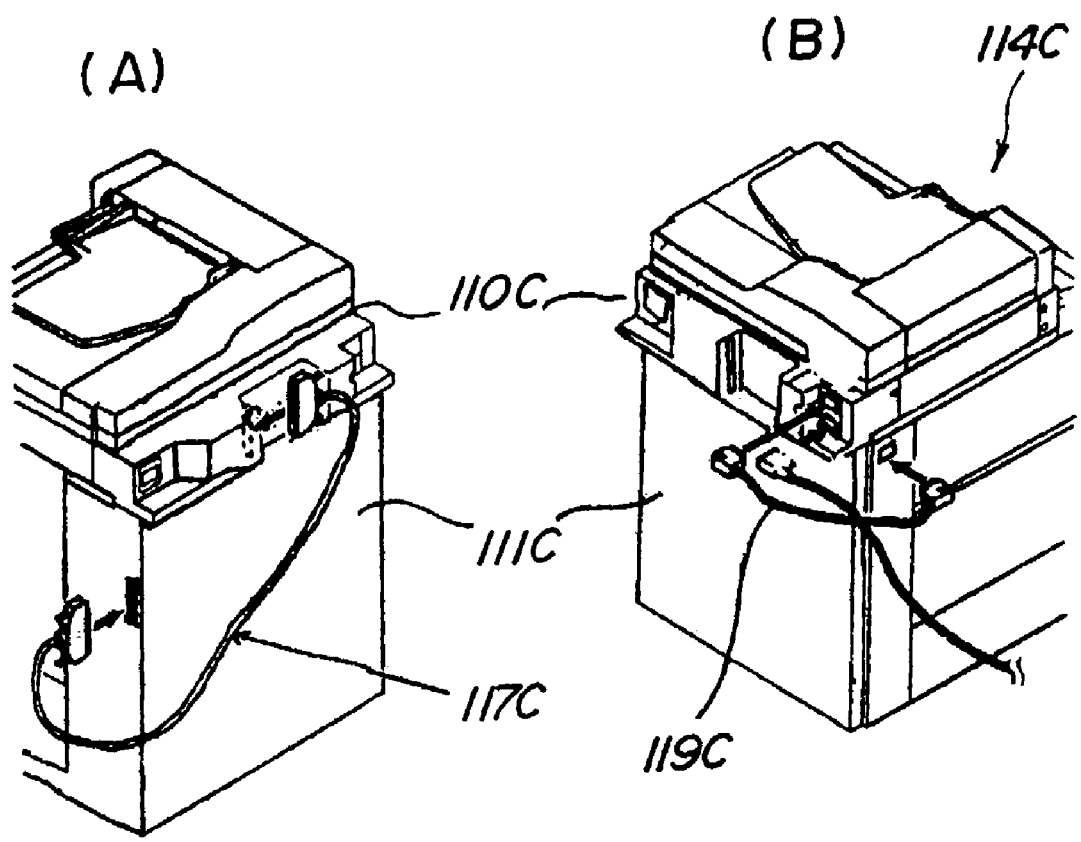
FIGS. 7(a), 7(b) are illustrations showing coupling of the printer apparatus and the reader apparatus.

Next, the steps for coupling the reader apparatus 110C to the printer apparatus 111C are described in reference to FIG. 5 through FIG. 7.

As shown in FIG. 5(A), two blinding portion 131C located on a rear side of the control panel 120C secured to the printer apparatus 111C are cut out by a nipper or the like. It is to be noted that although in this embodiment the blinding portions 131C are provided, such a blinding portion may not be provided, and if no blinding portion is placed, the process at the step shown in FIG. 5(A) is unnecessary.

Subsequently, as shown in FIG. 5(B), front fixing member 132C for the reader apparatus 110C are attached at two locations by screws 133.

As shown in FIG. 5(C), the rear holding member 134C for the reader apparatus is secured to the holding member 123C at two locations by screws 135C from the rear side of the printer apparatus 111C.

As shown in FIG. 5(D), the reader apparatus 110C is moved in arrow G direction, and position alignment holes 136C formed at the reader apparatus 110C are inserted into the front fixing member 132C for the reader apparatus. The reader apparatus 110C are thus aligned in arrow H1, H2 directions.

As shown in FIG. 6(A), the screws 137C for securing the optical apparatus in the reader apparatus 110C are disengaged (at three locations).

Then, as shown in FIG. 6(B), a connector for power supply of an original document automatic feeding apparatus 40C, and fixing screws 140C for a rear cover 139C of the reader apparatus 110C are disengaged, and the rear cover 139C is detached.

As shown in FIGS. 6(C), 6(D), a rear fixing member 141C for the reader apparatus is secured to the rear holding member 134C for the reader apparatus by screws 142C. This makes grounded a holding member 143C of the reader apparatus 110C and the rear holding member 134C for the reader apparatus and aligned the reader apparatus 110 in arrow J, K directions.

As described above, by coupling the front fixing member 132C for the reader apparatus described with FIG. 5(D) with the rear fixing member 141C for the reader apparatus described with FIG. 6(C), (D), the reader apparatus 110C can be positionally restricted in all directions of arrows H, J, K shown in FIG. 6(E). This refrains the users from touching the reader apparatus 110C and the reader apparatus 110C from moving even when an earthquake occurs.

Next, as shown in FIG. 7(A), the communication cable 117C for the reader apparatus 110C and the printer apparatus 111C is connected, and as shown in FIG. 7(B), a power supply cable 119C is connected for supplying electrical power to the reader apparatus 110C from the printer apparatus 111C.

A cable for a heater preventing the moisture from condensing on the reader apparatus incorporated in the reader apparatus 110C may be connected when necessary.

As described above, by assembling the reader apparatus 110C to the printer apparatus 111C, coupling of the reader apparatus 110C and the printer apparatus 111C is completed with a preparation against earthquake. It is to be noted that the steps in FIGS. 7(A), 7(B) are completed if the reader apparatus 110C are placed on the printer apparatus 111C.

[Layout of Cable and Delivery Means]

Figure 8:
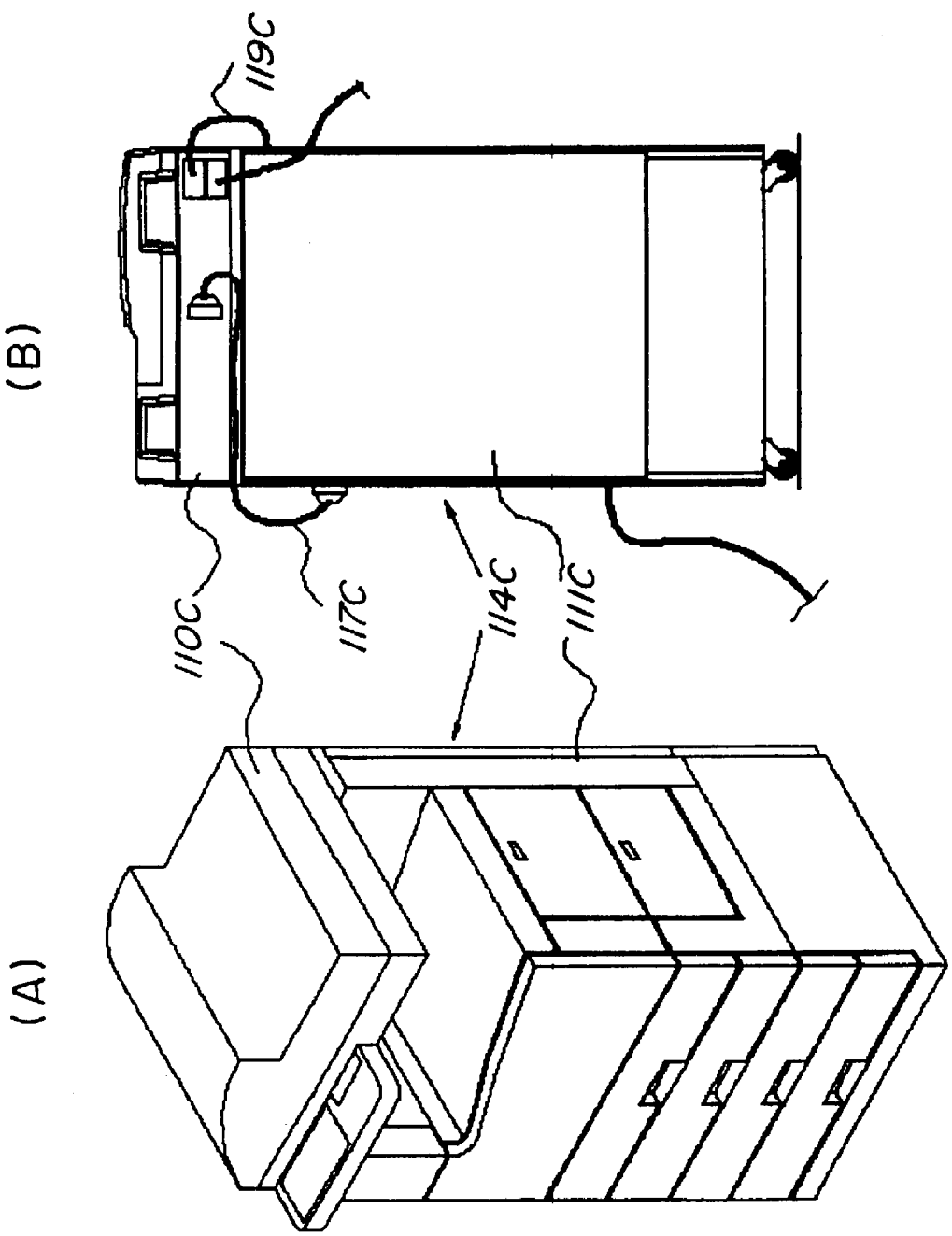
FIG. 8 is an illustration showing a photocopying image forming apparatus.
Figure 9:
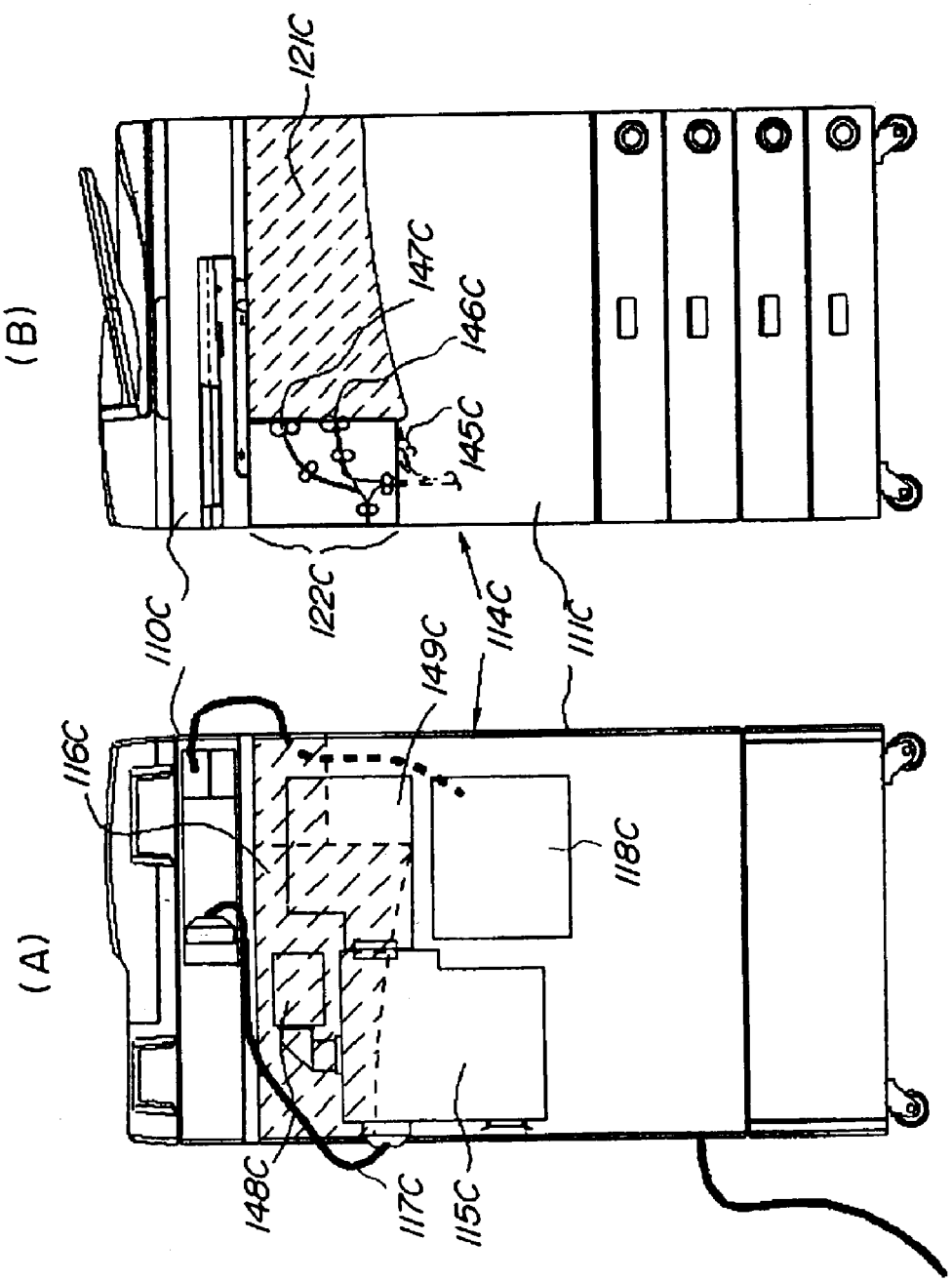
FIG. 9 is an illustration showing a housing for supporting the reader apparatus of the printer apparatus.

Next, the layout of respective cables and delivery means is described. FIG. 8 is for a layout in which the printer apparatus 111C is placed with the reader apparatus 110C; FIG. 8(A) is a front perspective view; FIG. 8(B) is an illustration viewed from the rear side. The communication cable 117C and the power supply cable 119C are coupled.

FIG. 9(A) is an illustration of the image forming apparatus viewed from the front side; FIG. 9(B) is an illustration of the image forming apparatus viewed from the rear side. As shown in FIG. 9(A), the side wall 122C is disposed over a first delivering means 145C, and utilizing this space, a second delivering means 146C and a third delivering means 147C can be arranged above the first delivering means 145C. This layout allows the first to third delivering means to serve as multiple delivery outlets in matching to use of the users such as the delivery outlets special for, e.g., photocopier, printer, and facsimile machine.

Thus, since the side wall 122C for mounting the reader apparatus 110C is arranged over the first delivering means 145C, the optional delivering means 146C, 147C can be placed and can improve the usability.

As shown in FIG. 9(B), the side wall 121C for mounting the reader apparatus 110C extends upward on the rear side of the printer apparatus. This structure allows electrical controlling members such as a printer controller 115C for electrically controlling the printer apparatus mechanism incorporated in the printer apparatus 111C and a DC controller 149C for controlling a hard disc drive 148C and respective drive sources, thereby utilizing advantageously the space on a rear side of the body.

Figure 10:
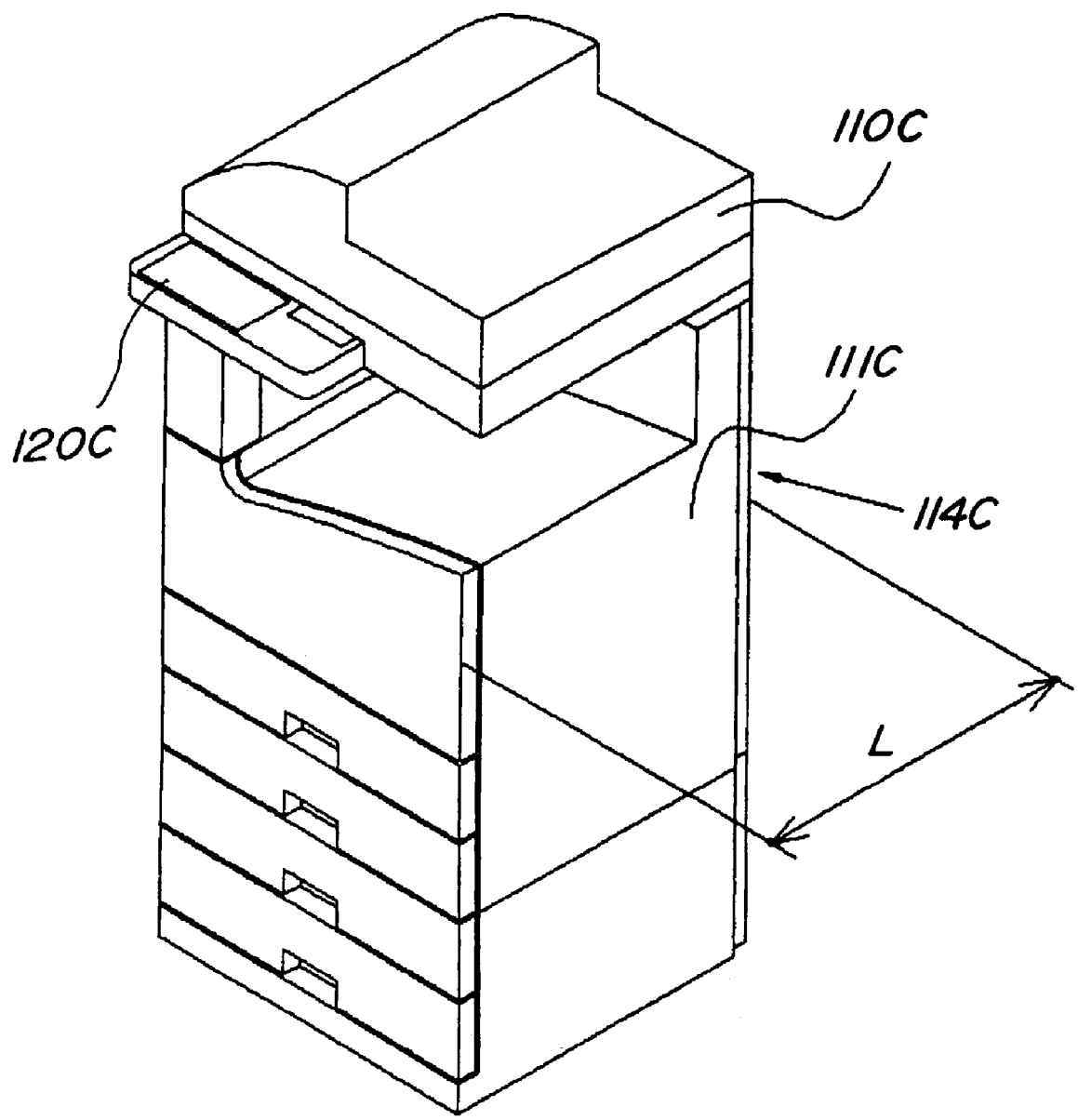
FIG. 10 is a perspective view showing a photocopying image forming apparatus.
Figure 12:
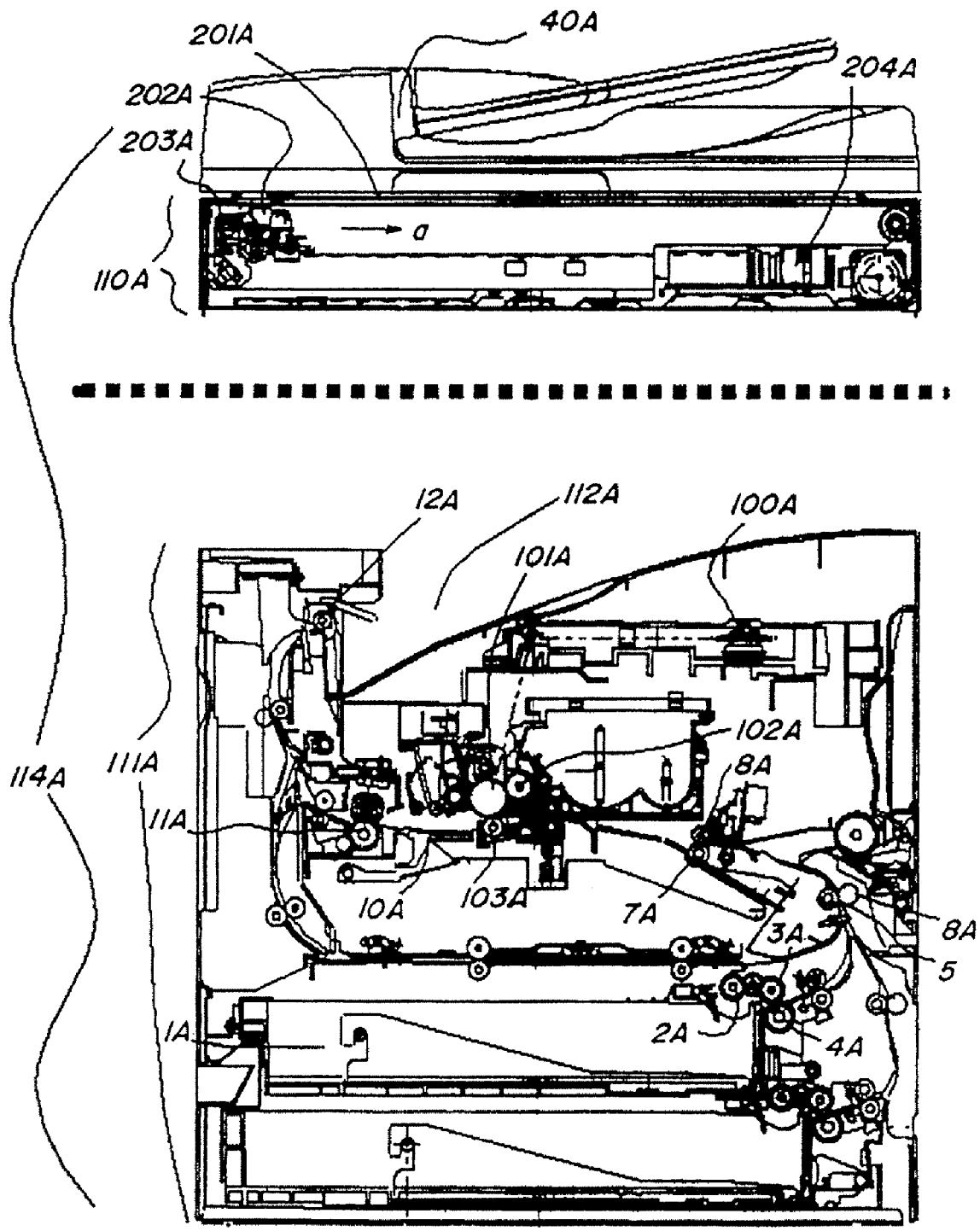
FIG. 12 is a structural diagram showing a photocopying image forming apparatus as a prior art.
Figure 13:
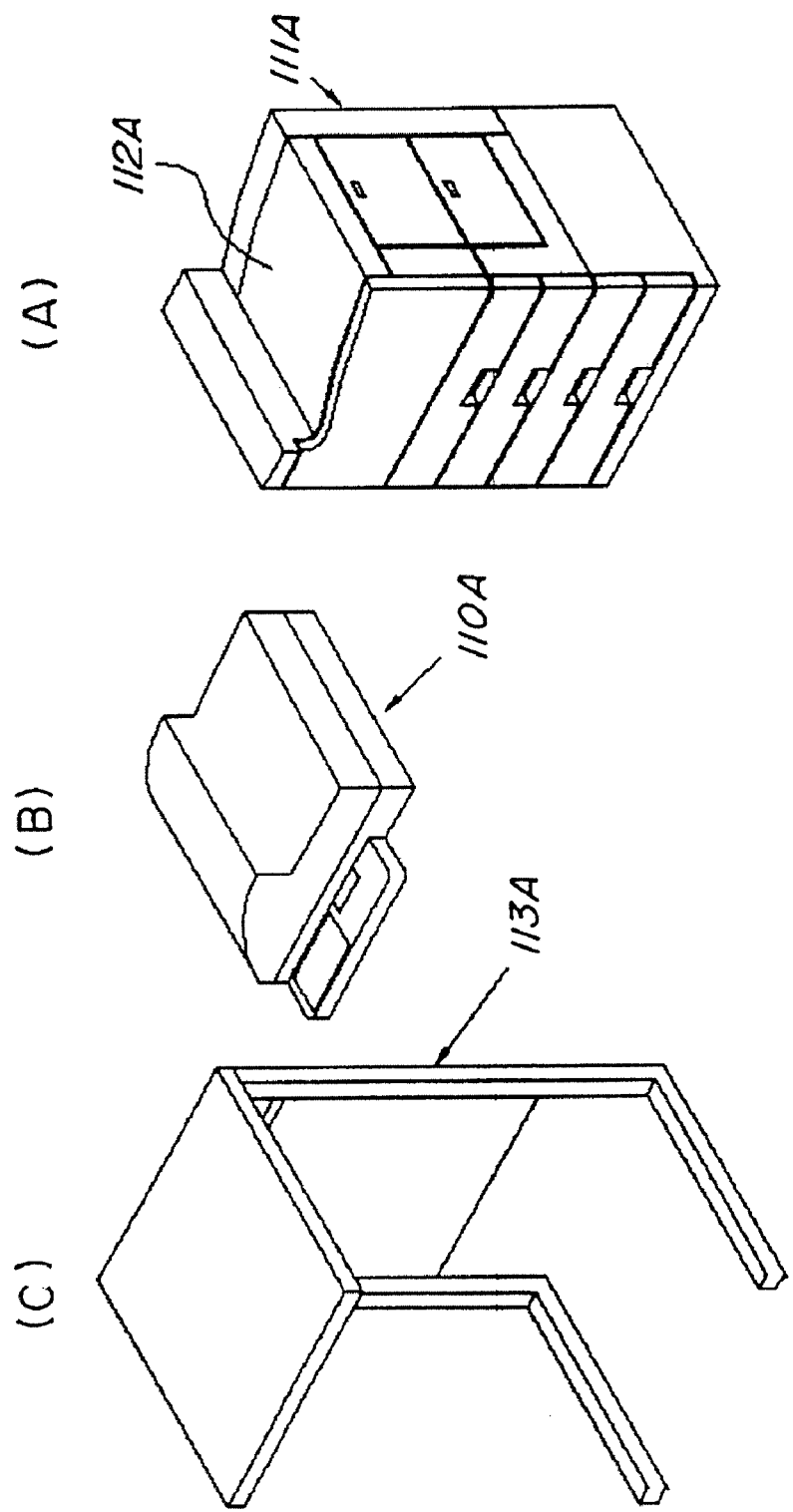
FIGS. 13(a) to 13(c) are illustrations showing a printer apparatus, a reader apparatus, and a rack apparatus as a prior art.
Figure 14:
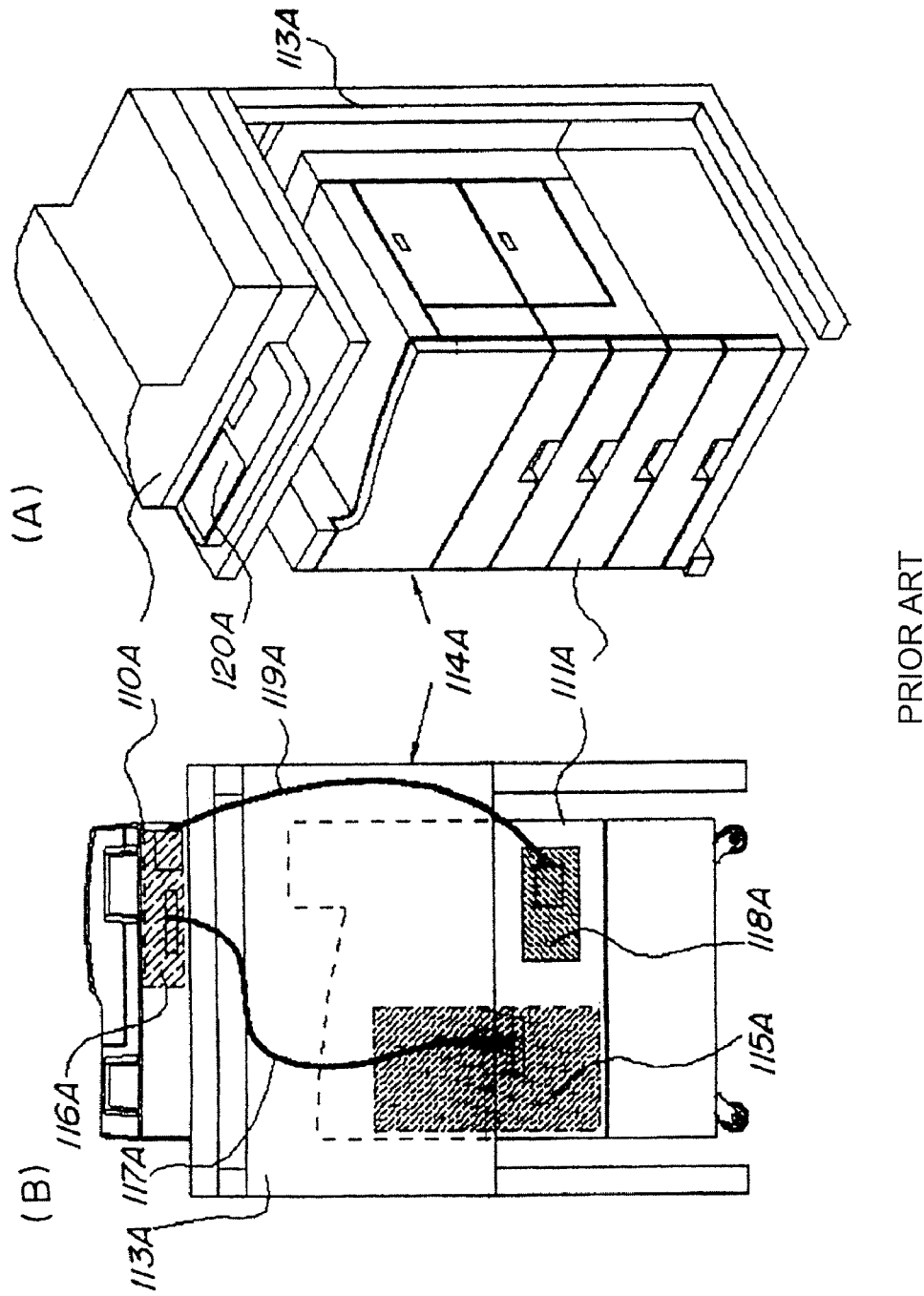
FIGS. 14(a), 14(b) are structural illustrations showing a photocopying image forming apparatus as a prior art.
Figure 15:
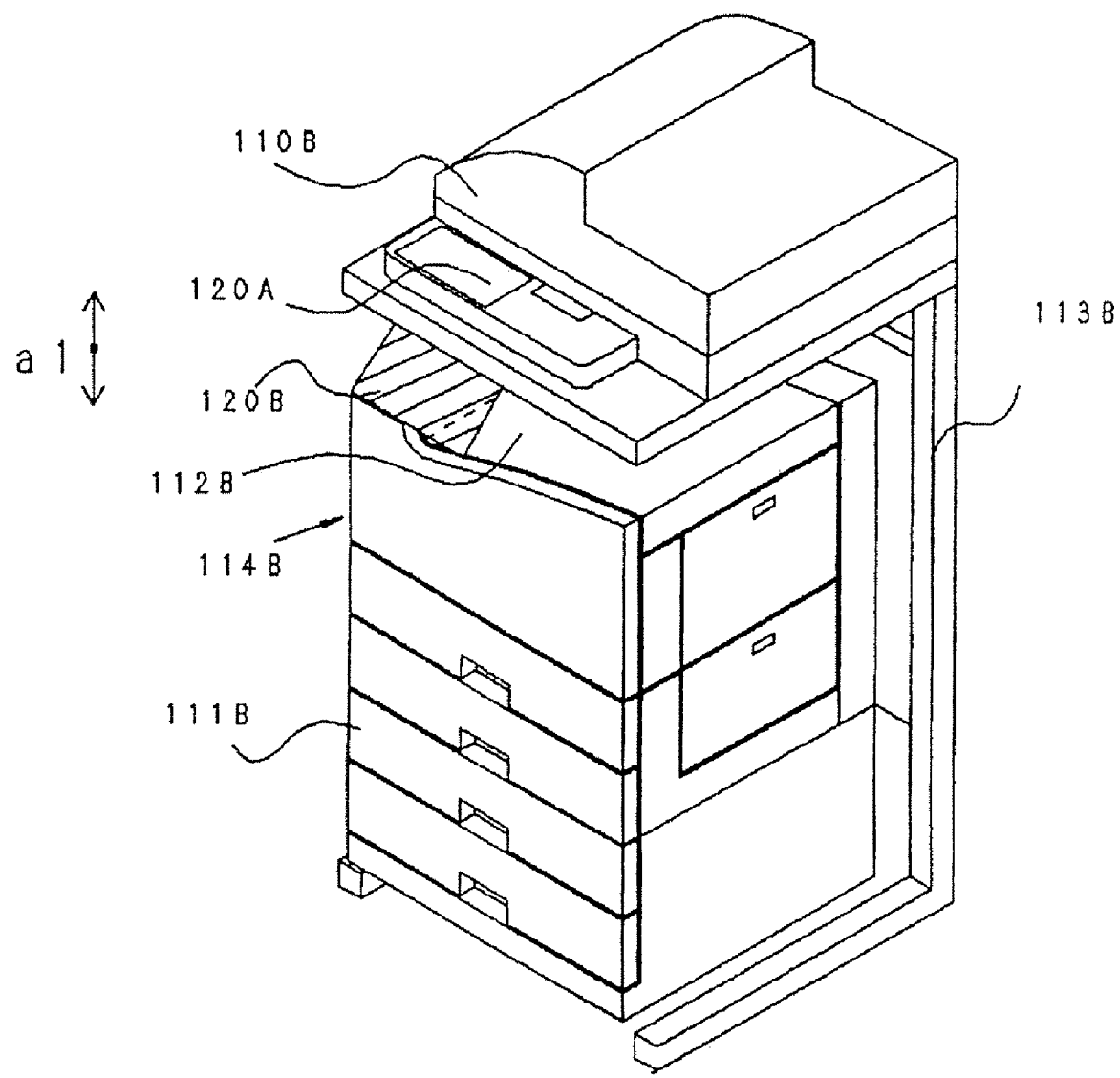
FIG. 15 is a structural illustration showing a photocopying image forming apparatus as a prior art.

The electrically controlling members (the printer controller 115C, the hard disc drive 148C, and DC controller 149C) can be arranged near the reader apparatus 110C, so that the communication cable 117C for coupling the printer controller 115C with the reader controller 116C, and the power supply cable 119C from the printer apparatus power unit 118C to the reader apparatus 110C are shortened, and so that an effect is obtainable against electromagnetic noises. Thus, by providing the layout for the electrically controlling members (the printer controller 115C, the hard disc drive 148C, and the DC controller 149C) from an extension of the mounting region on the rear side of the printer apparatus 111C, the depth L of the printer apparatus 111C as shown in FIG. 10 can be reduced, thereby rendering the size of the entire apparatus compact.

[Controlling Panel]

The controlling panel 120C for instructing the apparatus manipulations is formed at the housing for mounting the reader apparatus 110C, is secured on a front side of the apparatus body over the side wall 122C as described above, and is disposed at a position allowing the users to manipulate easily the panel.

The controlling panel 120C is structured for a common controlling panel used for the printer apparatus and for the photocopying image forming apparatus.

In the image forming apparatus according to the embodiment described above, the housing for holding the reader apparatus 110C on the printer apparatus 111C is provided to make unnecessary a separated arrangement of the rack apparatus for mounting the reader apparatus like in the prior art, so that the apparatus can be formed with greatly decreased costs.

Because the sheet delivery portion of the printer apparatus 111C is located at a lower portion of the reader apparatus 110C when the reader apparatus 110C is coupled to the top of the printer apparatus 111C, and because the side walls 121C, 122C serving as holding portions for holding the reader apparatus 110C are formed at two sides other than the front side of the apparatus body, the recorded sheets can be pulled out from the front side at an upper portion of the image forming apparatus, so that the sheets can be pulled out easily. The reader apparatus is accurately arranged by placing at the same level all of the holding surfaces placed at three or more locations for mounting the reader apparatus 110C.

Furthermore, the optional delivering means and the electrical controlling means can be arranged in the housing, so that the delivering means can be formed with good extensionality, so that the electrostatic noises can be reduced, and so that the entire apparatus body can be made compact as the mounting space is extended.

The arrangement of the common controlling panel 120C on a front side of the housing allows the controlling panel 120C to be placed at the level that the users can easily manipulate the panel 120C and renders unnecessary formation of respective controlling panels to the printer apparatus and the reader apparatus where the apparatus is extended from the mere printer apparatus 111C to the photocopying image forming apparatus to which the printer apparatus 111C and the reader apparatus 110C are coupled, so that the controlling panel can be placed at the most appropriate location as reducing the part numbers.

[Second Embodiment]

Next, as a second embodiment, an example in which a display screen of the controlling panel is switched between a case where the apparatus above described is solely used as a printer apparatus and a case where the apparatus is used as a photocopying image forming apparatus coupling the printer apparatus and the reader apparatus.

It is to be noted that the printer apparatus, the reader apparatus, and the coupled structure of those are the same as structures in the first embodiment described above.

The common controlling panel 120C is provided for a situation where the apparatus is used as the printer apparatus 111C and for a situation where the apparatus is used as the photocopying image forming apparatus, and has various manipulation monitor screens.

Upon connection via the communication cable 117C shown in FIG. 7(A) between the printer apparatus 111C and the reader apparatus 110C, the apparatus body recognizes switching to the photocopying image forming apparatus to which the printer apparatus 111C and the reader apparatus 110C are coupled. The screen is switched, upon turning on and off of the power switch, from a display screen of the controlling panel for the printer as shown in FIG. 11(A) to a display screen of the controlling panel for photocopying image forming apparatus at which photocopying, printing, and faxing are selectable as shown in FIG. 11(B).

With the display screen of the controlling panel for the printer as shown in FIG. 11(A), there is no indication of photocopying and faxing, and as electrical information, the screen shows information such as "BOX" as a holder for accumulating respective sources of information by the users stored in the electrical memory or other information accumulating apparatus in the printer apparatus body as well as information of the printer apparatus.

On the other hand, with display screen of the controlling panel for photocopying image forming apparatus as shown in FIG. 11(B), indicated are photocopy, facsimile, print (box), and extension (network information), and where the reader apparatus and facsimile machine is added to the printer apparatus 111C, this apparatus becomes the photocopying image forming apparatus in a multi-form of photocopier, facsimile machine, and printer.

It is to be noted that although in this embodiment the distinction between the using state for the printer apparatus and the using state for the photocopying image forming apparatus depends on whether the communication cable 117C is connected or disconnected, other structures may be possible such that the distinction is made depending on whether a cable for coupling when the reader apparatus is grounded is connected or disconnected, that the distinction is made depending on a switch provided for the printer apparatus or the reader apparatus, and that the distinction is made depending on an occurrence of downloading or memory replacement when the reader apparatus is grounded.

Thus, the screen of the display portion of the common controlling panel is automatically switched depending on the situations where the apparatus is used solely as the printer apparatus 111C and where the apparatus is used as the photocopying image forming apparatus in which the printer apparatus 111C is coupled to the reader apparatus 110C, thereby improving the usability.

It is to be noted that the structure that the controlling panel for controlling the printer apparatus 111C and the controlling panel for controlling the photocopying image forming apparatus are made common and that the display screen of the controlling panel when the apparatus is used solely as the printer apparatus 111C and when the apparatus is used as the photocopying image forming apparatus in which the printer apparatus 111C is coupled to the reader apparatus 110C, is automatically switched, is advantageous not only for a situation where the reader apparatus 110C is arranged on the housing of the printer apparatus 111C as described above but also for a distinction made at a glance to the screen of the controlling panel as to whether the apparatus is usable solely for the printer apparatus 111C or for the photocopying image forming apparatus even though the apparatus is useable as a photocopying image forming apparatus coupling the reader apparatus with the printer apparatus where the reader apparatus 110C is arranged on a lateral side of the printer apparatus 111C.

This invention, as described above, enhances the layout space of respective apparatuses constituting the image forming apparatus without needing any separate rack or the like but with lower costs, upon the arrangement of the reader apparatus to the housing of the printer apparatus where the image forming apparatus of an intra-machine delivery type is constituted from coupling of the reader apparatus and the printer apparatus, and enables the best layout of the respective parts.

Descriptions of the embodiments of the invention are as the above, but the invention is not limited to those embodiments, and various modifications can be made within a scope of technological conception of the invention.

What is claimed is:

1. An image forming apparatus comprising:
   a printer section having a sheet delivery portion at a top thereof;
   a rear side frame disposed behind the printer section;
   a lateral side frame disposed on one lateral side of the printer section;
   a top frame having a substantially L-shape and fixed on top surfaces of the rear side frame and the lateral side frame; and
   a common operating portion which is utilized both when an image reader is optionally attached to the printer section, and when the image reader is not attached to the printer section,
   wherein when the image reader is optionally attached to the top frame, a sheet can be pulled out of both of a front side and another lateral side at which the top frame is not provided.

2. The image forming apparatus according to claim 1, wherein the top frame has three or more supporting points for supporting the image reader.

3. The image forming apparatus according to claim 1, wherein a sheet delivery means for delivering a sheet, and a controlling member for controlling electrically the image forming apparatus are formed within the rear side frame and the lateral side frame.

4. The image forming apparatus according to claim 1, wherein the operating portion is formed at the top frame.

5. The image forming apparatus according to claim 4, wherein the operating portion is located on a front side of the image reader where the image reader is attached.

6. The image forming apparatus according to claim 1, wherein the common operating portion has a display portion for displaying information of the image forming apparatus and the common operating portion instructs functions of the image forming apparatus.

7. The image forming apparatus according to claim 6, wherein the operating portion can switch operation of the image forming apparatus between a printer display mode when the image reader is detached and a photocopier display mode when the image reader is attached.

8. The image forming apparatus according to claim 7, wherein the operation of the image forming apparatus is switched from the printer display mode to the photocopier display mode when the image reader is attached.

* * * * *

UNITED STATES PATENT AND TRADEMARK OFFICE
CERTIFICATE OF CORRECTION

PATENT NO. : 7,298,979 B2
APPLICATION NO. : 10/390728
DATED : November 20, 2007
INVENTOR(S) : Yukihiro Kitozaki It is certified that error appears in the above-identified patent and that said Letters Patent is hereby corrected as shown below:

ON THE COVER PAGE
    In item "(56) References Cited," under "FOREIGN PATENT DOCUMENTS," in the last line, "JP 2002060119" should read -- JP 2002-060119 --.

COLUMN 1
    Line 18, "coupling" should read -- couples --.
    Line 47, "pair 5A." should read -- pair 5A, --.

COLUMN 2
    Line 13, "apparatus 111A" should read -- apparatus 111A; --.
    Line 34, "apparatuses 111A," should read -- apparatuses 110A, --.
    Line 37, "111A," should read -- 110A, --.
    Line 38, "needing" should read -- of the need --.
    Line 40, "apparatus" should read -- apparatuses --.

COLUMN 4
    Line 15, "cassette IC" should read -- cassette 1C --.
    Line 17, "IC" should read -- 1 C --.
    Line 18, "IC" should read -- 1C--.
    Line 23, "pair 5C." should read -- pair 5C, --.
    Line 48, "aide" should read -- side --.

COLUMN 5
    Line 26, "hosing" should read -- housing --.
    Line 35, "at or" should read -- or at --.
    Line 41, "accurate" (second occurrence) should read -- accurately --.
    Line 58, "portion" should read -- portions --.
    Line 65, "member" should read -- members --.

COLUMN 6
    Line 9, "are" should read -- is --.
    Line 24, "aligned" should read -- aligns --.
    Line 48, "are" should read -- is --.
    Line 65, "to" should read -- the --.

UNITED STATES PATENT AND TRADEMARK OFFICE
CERTIFICATE OF CORRECTION

PATENT NO. : 7,298,979 B2
APPLICATION NO. : 10/390728
DATED : November 20, 2007
INVENTOR(S) : Yukihiro Kitozaki It is certified that error appears in the above-identified patent and that said Letters Patent is hereby corrected as shown below:

<u>COLUMN 8</u>
    Line 9, "as reducing" should read -- so as to reduce --.
    Line 11, "embodiment, an" should read -- embodiment, is an --.
    Line 48, "is" should read -- are --.

Signed and Sealed this

Fifteenth Day of July, 2008

JON W. DUDAS
*Director of the United States Patent and Trademark Office*